United States Patent
Mielenz

(10) Patent No.: US 9,947,223 B2
(45) Date of Patent: Apr. 17, 2018

(54) VALET PARKING METHOD AND SYSTEM

(71) Applicant: Robert Bosch GmbH, Stuttgart (DE)

(72) Inventor: Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/314,413

(22) PCT Filed: May 21, 2015

(86) PCT No.: PCT/EP2015/061290
§ 371 (c)(1),
(2) Date: Nov. 28, 2016

(87) PCT Pub. No.: WO2015/193059
PCT Pub. Date: Dec. 23, 2015

(65) Prior Publication Data
US 2017/0200367 A1    Jul. 13, 2017

(30) Foreign Application Priority Data

Jun. 17, 2014    (DE) ........................ 10 2014 211 557

(51) Int. Cl.
*B60Q 1/48*       (2006.01)
*G08G 1/14*       (2006.01)
(Continued)

(52) U.S. Cl.
CPC .............. *G08G 1/146* (2013.01); *B60W 30/06* (2013.01); *G05D 1/0212* (2013.01);
(Continued)

(58) Field of Classification Search
CPC .......... G08G 1/146; G08G 1/142; G08G 1/04; B60W 30/06; B60W 2420/42;
(Continued)

(56) References Cited

U.S. PATENT DOCUMENTS

2010/0156672 A1*  6/2010  Yoo ......................... G08G 1/14
                                                340/932.2
2012/0188100 A1*  7/2012  Min ....................... G08G 1/143
                                                340/932.2
(Continued)

FOREIGN PATENT DOCUMENTS

DE      102009029720 A1    12/2010
DE      102012222562 A1     6/2014

OTHER PUBLICATIONS

Ibisch, Andre et al., "Towards highly automated driving in a parking garage: general object localization and tracking using an environment-embedded camera system" IEEE Intelligent Vehicles Symposium Proceedings, Jun. 8, 2014, p. 136-431.
(Continued)

*Primary Examiner* — Dhaval Patel
(74) *Attorney, Agent, or Firm* — Norton Rose Fulbright US LLP; Gerard Messina

(57) ABSTRACT

A valet parking system for automatically bringing a vehicle to a parking space within a predefined parking area. The valet parking system includes a central control unit and a parking-space monitoring system having a stationary parking-space sensor. The parking-space monitoring system is designed to detect the current state of occupancy of the parking spaces of the parking area and to transmit that to the central control unit. The parking-space monitoring system may localize all autonomously moving or waiting vehicles that are currently in transit autonomously within the parking area either to be brought to their assigned parking space or received by their driver at a predefined pick-up location, and to transmit information about the present position of all these vehicles to the central control unit. A free parking space is assigned to the vehicle by the central control unit as a function of the geometrical dimensions of the vehicle.

12 Claims, 2 Drawing Sheets

(51) Int. Cl.
  *B60W 30/06* (2006.01)
  *G05D 1/02* (2006.01)
  *G08G 1/04* (2006.01)
  *G05D 1/00* (2006.01)

(52) U.S. Cl.
  CPC ......... *G05D 1/0246* (2013.01); *G05D 1/0282* (2013.01); *G05D 1/0285* (2013.01); *G08G 1/04* (2013.01); *G08G 1/142* (2013.01); *B60W 2420/42* (2013.01); *B60W 2550/40* (2013.01); *G05D 1/0088* (2013.01); *G05D 2201/0213* (2013.01)

(58) Field of Classification Search
  CPC ............ B60W 2550/40; G05D 1/0212; G05D 1/0285; G05D 1/0088
  USPC ...... 340/932.2, 928, 539.1, 473; 701/23, 24, 701/28, 31.5, 119; 705/5, 13
  See application file for complete search history.

(56) References Cited

U.S. PATENT DOCUMENTS

| 2014/0195138 | A1* | 7/2014 | Stelzig | G08G 1/0116 |
| | | | | 701/119 |
| 2014/0218527 | A1* | 8/2014 | Subramanya | G08G 1/143 |
| | | | | 348/148 |
| 2015/0279210 | A1* | 10/2015 | Zafiroglu | G08G 1/065 |
| | | | | 340/932.2 |

OTHER PUBLICATIONS

International Search Report dated Sep. 4, 2015, of the corresponding International Application PCT/EP2015/061290 filed May 21, 2015.

\* cited by examiner

VALET PARKING METHOD AND SYSTEM

FIELD

The present invention relates to a valet parking method and a valet parking system for automatically bringing a vehicle to an assigned parking space within a predefined parking area.

BACKGROUND INFORMATION

A valet parking method is to be understood here specifically as a method in which a driver of a vehicle is able to drop it off at a predetermined drop-off location, whereupon the vehicle is parked in automated fashion or by service personnel and is provided to the driver again upon request or appointment. The present invention deals especially with a valet parking method, in which vehicles are parked by an automatic system. In this context, the vehicles move without the assistance of a human driver to an assigned parking space and back again to a pick-up location.

The German Patent No. DE 10 2012 222 562 describes a system for managed parking lots, what is referred to as a valet parking system, for transferring a vehicle from a start position to a destination position. Provided in that case are a stationary central processing unit for calculating a path of motion, along which the vehicle moves autonomously to the destination position, and a transmitting device for transmitting the path of motion to the vehicle. The central processing unit is designed to generate speed-control signals and to deliver them to the transmitting device for transmission to the vehicle, so that the vehicle, controlled by the speed-control signals, is able to move along the path of motion to the destination position.

U.S. Patent Appl. Pub. No. 2010/0156672 A1 describes a system for automatic valet parking. The system includes a central control, vehicle-guide sensors and parking-space sensors. Through the parking-space sensors, the central control knows the state of occupancy of any given parking space. Arriving vehicles are assigned a parking space, and the central control determines a path of motion to this parking space. Position and movement of vehicles are detected by the vehicle-guide sensors and transmitted, together with the data about the path of motion, to the vehicle, so that it is able to follow the path autonomously. Further data may be used in selecting the parking space, such as the average stay of the respective vehicle. For example, vehicles with a short stay may be parked closer to the exits.

German Patent No. DE 10 2009 046 912 A1 describes a method in which a vehicle at a start position is informed of a trajectory which guides the vehicle to a free parking space. In addition, markings by which the vehicle is able to follow the trajectory are provided on the traffic areas. Central monitoring of the positions of all vehicles, as well as a central control of the vehicles are not provided.

German Patent No. DE 10 2009 054 292 A1 relates to a parking guidance system which dispenses with a central sensor system. The localization systems and surround sensors available in the vehicles are used to determine the situation in the parking area.

German Patent No. DE 10 2009 048 516 A1 describes a parking guidance system having sensors for detecting the parking situation, and variable parking-space markings. The system determines the number and size of the vehicles and distinguishes at least between passenger cars and trucks. With the aid of variable parking-space markings, the system is able to improve the capacity utilization of the parking area by individually adjusting the number of parking places designated for passenger cars and trucks.

In those conventional valet parking systems, in which stationary sensors are employed to monitor the current state of occupancy of the parking area and/or the present positions of the autonomously parking or waiting vehicles, the problem exists that the field of view of these sensors may be restricted by inconveniently parked vehicles, especially very large or high vehicles, or by spatial structural conditions of the parking area such as columns, for example. Therefore, there may no longer be sufficient information available to a central control system of the valet parking system in order to ideally utilize the parking area available or to ensure that the autonomously moving vehicles are brought safely to their assigned parking spaces and/or to a pick-up area. To solve this problem, for example, conventional systems use a great number of sensors, so that, for instance, each individual parking space or two opposite parking spaces are in each case monitored by one sensor. These design approaches are complex and cost-intensive.

SUMMARY

According to the present invention, a valet parking system is provided to automatically bring a vehicle to a parking space within a predefined parking area. In this context, it is provided that the vehicle moves autonomously to the assigned parking space. The valet parking system includes a central control unit and a parking-space monitoring system having at least one stationary parking-space sensor. The parking-space monitoring system is designed to detect, especially continuously, the current state of occupancy of the parking spaces of the parking area and to transmit the current state of occupancy to the central control unit. Additionally or alternatively, the parking-space monitoring system is designed to localize all autonomously moving or waiting vehicles that are currently in transit within the parking area in order either to be brought to their assigned parking space or, for example, to be received by their driver at a predetermined pick-up location, and to transmit information about the present position of all these vehicles to the central control unit. Preferably, at least one of the parking-space sensors of the parking-space monitoring system is in the form of a 2-D camera or 3-D camera.

The central control unit is designed to assign a free parking space to a vehicle and to transmit information to the vehicle, so that the vehicle is able to move autonomously along a trajectory to the assigned parking space. To that end, the central control unit, e.g., via a wireless data connection, is able to transmit position information about the assigned parking space to the vehicle, which allows the vehicle to autonomously approach the assigned parking space. In addition, for example, information about a trajectory may also be transmitted from the central control unit to the vehicle, so that the vehicle is able to approach the assigned parking space autonomously along the trajectory. To that end, for instance, the trajectory may include suitable directional information, steering-angle information and speed information. In addition, the trajectory may include information concerning positions and durations of intermediate stops which may be necessary if several vehicles are maneuvering autonomously within a spatially tight parking area at the same time. In particular, the trajectory may be adjusted continuously as a function of instantaneous information of the parking-space monitoring system, and the trajectory, adjusted in each instance, may be transmitted to the vehicle. Thus, collisions with objects appearing in unplanned fashion may effectively be avoided.

According to the present invention, a free parking space is assigned to the vehicle by the central control unit as a function of the geometrical dimensions, especially the height, of the vehicle. Consequently, it may be ensured that the field of view of the stationary parking-space sensors of the parking-space monitoring system is not obstructed by inconveniently parked vehicles. Particularly in the case of parking garages, in which parking-space sensors are often mounted centrally on the parking-garage ceiling, vehicles with great height may obstruct the "view" by a parking-space sensor of a parking space behind them, so that the state of occupancy of this parking space is no longer clearly determinable by the parking-space monitoring system, or several parking-space sensors become necessary. The assignment of a free parking space as a function of the geometrical dimensions, especially the height, of the vehicle according to the present invention ensures that the state of occupancy of all parking spaces in the parking area is ascertainable at any time by the parking-space monitoring system, and that objects in the parking area which would make it necessary to adjust the trajectory when parking or leaving a space are recognized reliably at all times, and at the same time, the number of parking-space sensors may be kept to a minimum.

To that end, notably, a free parking space is assigned to the vehicle in such a way that obstruction of the field of view of the parking-space sensors of the parking-space monitoring system by the parked vehicle is minimized. In so doing, in particular, an average size distribution of vehicles is assumed, which may be determined by statistical samplings, for example.

Preferably, the parking-space sensor(s) of the parking-space monitoring system is/are disposed in such a way that the entire field of view of the parking-space monitoring system covers a maximum number of parking spaces and/or all access routes and maneuvering areas between the parking spaces.

Preferably means are provided to determine the geometrical dimensions, especially the height, of the vehicle. For example, the vehicle height may be measured by suitable sensors when the vehicle drives in and prior to the assignment of a parking space, and the measured value may be transmitted to the central control unit. Additionally or alternatively, the vehicle type or the vehicle model may also be detected, and the geometrical data concerning the corresponding vehicle type may be taken from a table stored especially in the central control unit or another data storage unit.

In addition, the present invention relates to a method for laying out a valet parking system as described above. According to the present invention, the number and placement of the stationary parking-space sensors of the parking-space monitoring system are selected in such a way that at all times, thus, in the case of all possible states of occupancy of the parking area, sufficient detection of the state of occupancy of all parking spaces of the predefined parking area and/or all positions of the autonomously moving or waiting vehicles is provided by the parking-space monitoring system. In particular, this is achieved in that the parking-space sensors are placed by assuming an occupancy of the predefined parking area with vehicles of an average size distribution. In addition, in the present invention, it is presumed that the parking spaces are assigned to the vehicles according to the invention as a function of their respective geometrical dimensions, especially the vehicle height.

In addition, preferably geometrical features of the predefined parking area and possible sight obstructions such as pillars, columns or walls are taken into account in determining the number and placement of the parking-space sensors.

The present invention also relates to a method for automatically bringing a vehicle to an assigned parking space within a predefined parking area, the current state of occupancy of the parking spaces of the parking area and/or the present position of autonomously moving or waiting vehicles within the parking area being detected continuously by a parking-space monitoring system having at least one parking-space sensor, and the current state of occupancy and/or the present position of the autonomously moving or waiting vehicles being transmitted to a central control unit. Upon request, the central control unit assigns a free parking space to an arriving vehicle and transmits information to the vehicle, so that the vehicle is able to be brought autonomously—thus, without assistance of the driver—along a trajectory to the assigned parking space. In particular, the trajectory may be adjusted continually as a function of instantaneous information of the parking-space monitoring system. Thus, collisions with objects appearing accidentally within the predefined parking area may effectively be avoided.

According to the present invention, a free parking space and/or a trajectory is/are assigned to the vehicle as a function of the size, especially the height, of the vehicle in such a way that obstruction of the field of view of the parking-space sensors by the vehicle during and/or after the parking maneuver is minimized.

Given a valet parking system for vehicles moving in automated fashion, the idea underlying the present invention is to assign the available parking spaces to a vehicle in such a way that, depending on the specific vehicle size, especially the vehicle height, the field of view of the parking-space sensors provided is obstructed as little as possible. With that, the localization of the vehicles with the aid of infrastructure-bound, thus, stationary sensor systems is implemented robustly, and investment costs are kept low due to a minimal number of sensors and further hardware. In addition, utilization of the available parking area is optimized.

The method does not remain restricted only to parking situations, but also addresses the localization of vehicles on feeder routes, for which sight obstructions by parked vehicles may occur.

Furthermore, the present invention also includes methods for the optimal positioning of parking-space sensors, like video-camera systems, for example, in the context of a given 3-D description of the parking environment or parking area, including all parking spaces, to minimize investment costs. With the aid of a size distribution of the parking vehicles to be anticipated on average, it is determined, based on geometrical considerations of the field of view of the planned sensor system and possible sight obstructions, at which positions of the given geometry of the parking area sensors must be mounted, so that adequate visibility of the parking and waiting vehicles is ensured at all times and in all situations and states of occupancy of the parking area.

Advantages of the present invention include an increase in the robustness of the localization of vehicles moving in automated fashion in valet parking systems, which use infrastructure-bound localization sensors (e.g., a video sensor system mounted on a ceiling of a parking garage), as well as in the minimization of investment costs owing to an optimized number of surround sensors.

The present invention is described below on the basis of figures and further exemplary embodiments.

DETAILED DESCRIPTION OF EXAMPLE EMBODIMENTS

Figure 1:
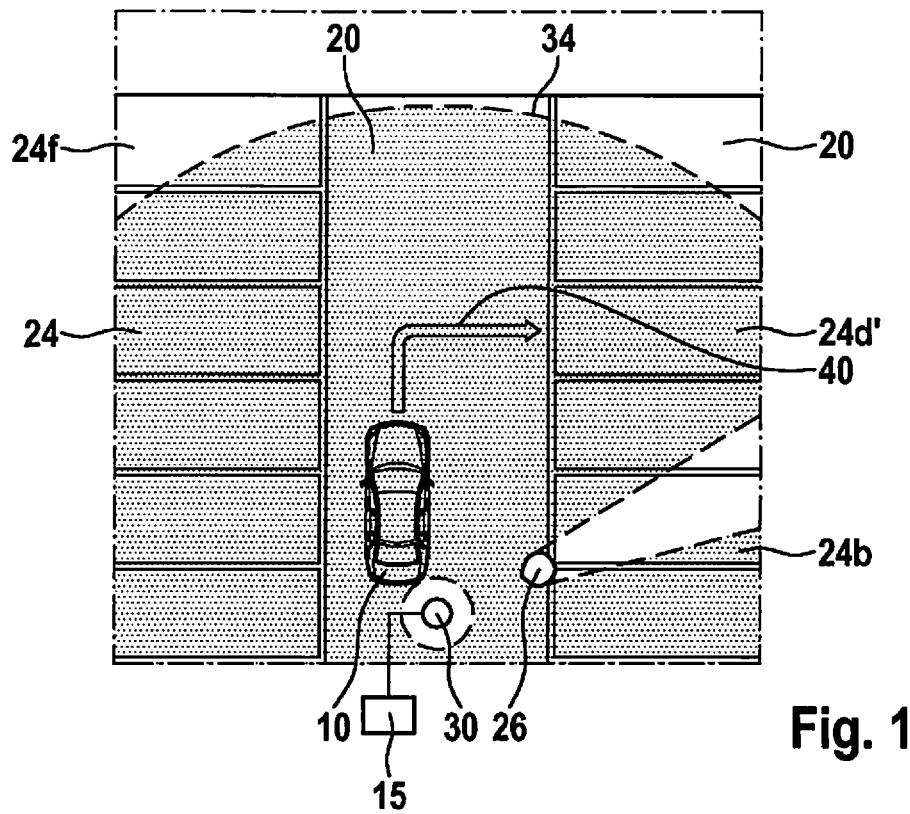
FIG. 1 shows an unoccupied parking area which is part of a valet parking system, a permanently installed parking-space sensor being provided as parking-space monitoring system.

FIG. 1 shows a bird's-eye view of a parking area 20 with multiple parking spaces 24. For example, parking area 20 may be one level of a parking garage or an outdoor parking place. A vehicle 10 is about to move autonomously along a trajectory 40 to an assigned parking space 24'. To that end, vehicle 10 must be designed to move autonomously, thus, without the presence or assistance of a driver, to a specific destination 24'. For instance, vehicle 10 moves automatically along an intended trajectory 40, or a suitable control unit of the vehicle itself calculates a trajectory 40 as a function of determined or received surround-field information and causes vehicle 10 to travel over it. Autonomous vehicles 10 of this kind are known in various designs from the related art, and therefore shall not be further discussed here.

In the front region, parking area 20 has a single parking-space sensor 30 in the form of a video camera with a field of view 34, which is part of a parking-space monitoring system. With the aid of parking-space sensor 30, the parking-space monitoring system continuously detects the current state of occupancy of parking spaces 24 and transmits it to a central control unit 15, e.g., a computer or server. The transmission may be accomplished in wire-bound or wireless manner using known data-transmission methods. Moreover, the parking-space monitoring system is able to determine the present position of one or more vehicles 10, which at a given moment are in transit within parking area 20, thus, are not parked, but rather are on the way from or to a parking space 24. This position information of moving or waiting vehicles 10 is likewise transmitted to central control unit 15.

Upon request, e.g., by a customer of the valet parking system who would like to have his vehicle parked, central control unit 15 assigns a free parking space 24' to vehicle 10 and transmits the necessary information to vehicle 10, so that vehicle 10 is able to head autonomously for parking space 24'. For instance, this information may include a trajectory 40, thus, path information, which is processed by vehicle 10, or rather a control unit of vehicle 10, so that vehicle 10 moves autonomously along trajectory 40 to assigned parking space 24'. Alternatively or additionally, it is possible for central control unit 15 to transmit destination information, e.g., the coordinates of assigned parking space 24' to vehicle 10, so that optionally, a control unit of vehicle 10 may independently generate a trajectory 40, along which vehicle 10 moves to assigned parking space 24'. Notably, trajectory 40 may be adjusted continuously as a function of instantaneous information of the parking-space monitoring system. Thus, collisions with objects appearing accidentally may effectively be avoided.

Advantageously, trajectory 40 may also include speed information, in connection with waiting positions as well, which is coordinated with other vehicles moving within parking area 20, so that a smooth procedure results, even in the case of dense occupancy of parking area 20 and high frequency of parking and pulling-out maneuvers.

From FIG. 1, it is evident that single parking-space sensor 30 is placed so that all parking spaces 24 are located at least partially within field of view 34 of parking-space sensor 30. For example, even though parking space 24f, because of its spatial distance from parking-space sensor 30, and parking space 24b, because of its view-blocking obstacle 26 (e.g., a support pillar), are only able to be seen partially by the parking-space sensor, the visible portion of all parking spaces 24 is great enough that the current state of occupancy of each parking space 24 is able to be detected by parking-space sensor 30.

Figure 2:
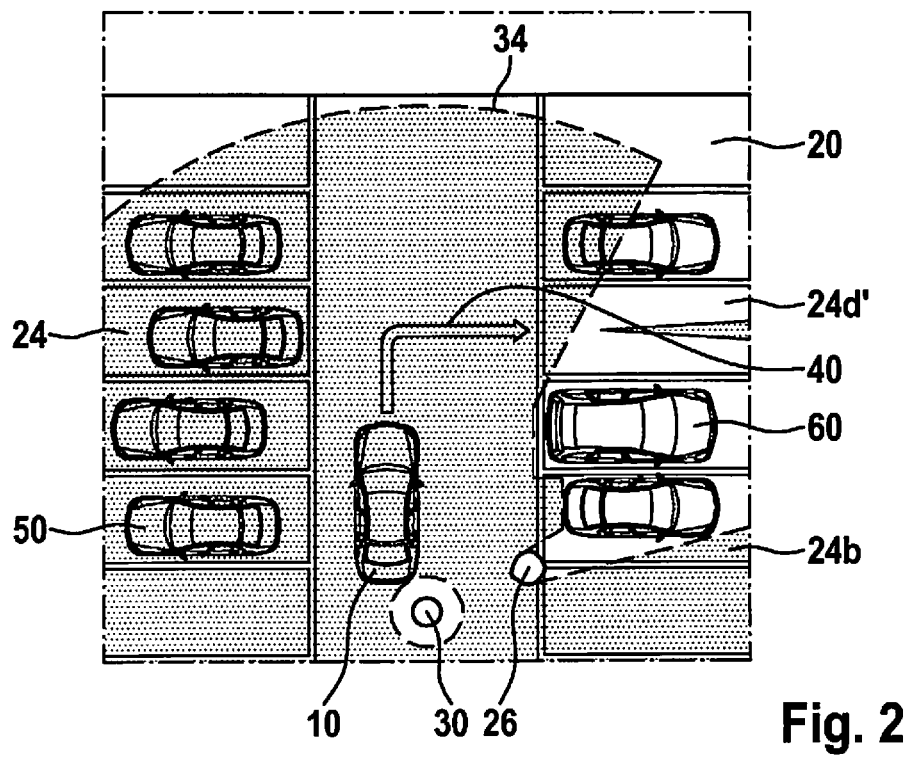
FIG. 2 shows a partially occupied parking area, which is part of a valet parking system.

However, the fact that this only holds true if all parking spaces 24 of parking area 20 are unoccupied, becomes clear from FIG. 2: If parking area 20 is already partially occupied by parked vehicles 50, 60, then sight obstructions of field of view 34 of parking-space sensor 30 may come about owing particularly to large or high vehicles 60 like a minivan, for example, or a vehicle of the multivan category, so that the state of occupancy of certain parking spaces, like here parking space 24d', can no longer be clearly determined, vehicle 10 to be parked can no longer be exactly pinpointed on the last part of trajectory 40, and a precise control for reaching the destination position is no longer able to be ensured. As a result, it is not possible to reliably avoid material damage by collisions with objects located outside of field of view 34.

Figure 3:
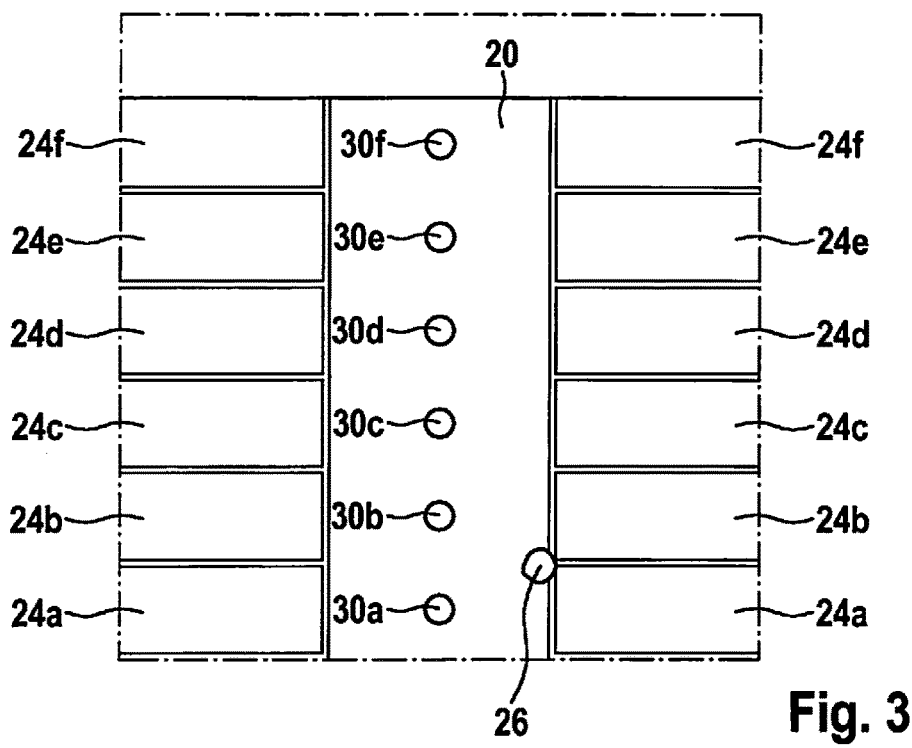
FIG. 3 shows a sensor configuration of a valet parking system according to the related art.

One conventional solution for this problem is shown in FIG. 3. To attain optimal coverage of all parking spaces 24 in order to avoid material damage, without having to experience sight obstruction of field of view 34 by parked vehicles 50, 60, a parking-space sensor 30a-30f is positioned between each pair of laterally opposite parking spaces 24a-24f. The large number of parking-space sensors 30a-30f needed results in high investment costs.

Figure 4:
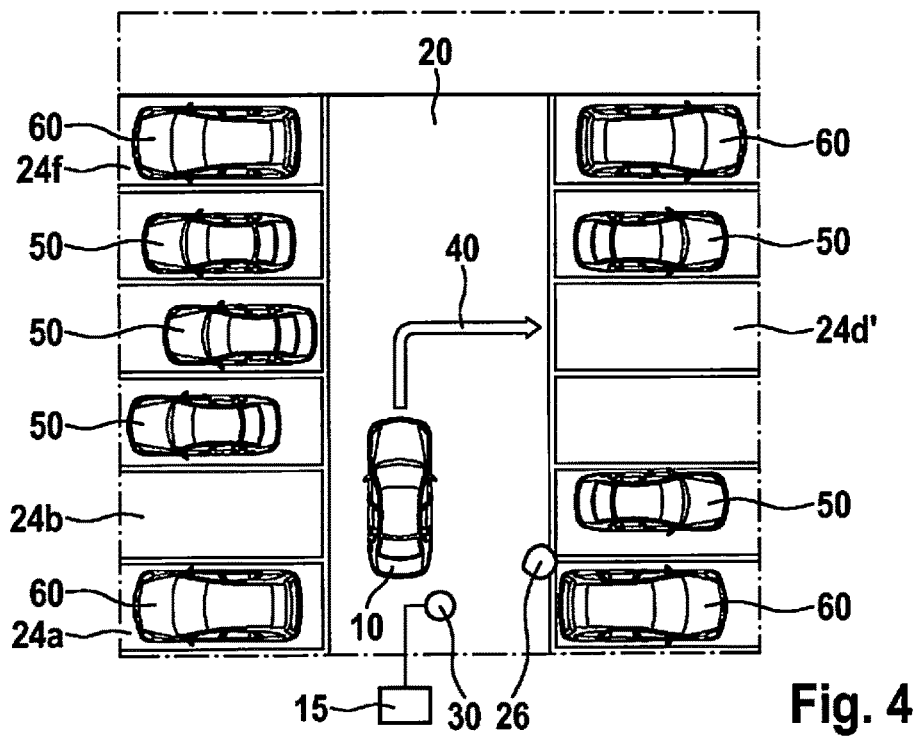
FIG. 4 shows a partially occupied parking area that is part of a valet parking system, the parking spaces being assigned according to the present invention as a function of the vehicle size or the vehicle height.

FIG. 4 shows an assignment of parking spaces 24 according to the present invention. The method of the present invention now provides to determine the vehicle size, e.g., by measuring the vehicle height upon pulling into parking area 20, or by comparison with data stored with respect to the vehicle size of a particular type of vehicle, and to select assigned parking space 24' as a function of the vehicle size in such a way that maximum visibility of the parking spaces by parking-space sensors 30 may be achieved. To that end, in this example, the largest vehicles 60 to be anticipated are parked directly laterally of parking-space sensor 30 in parking space 24a, and at the furthest field of view, in parking space 24f. In between, parking spaces are assigned to vehicles 50 by a heuristic method in such a way that, in particular, smaller vehicles, e.g., of the smart type or the like, are parked close to parking-space sensor 30, and with growing distance from parking-space sensor 30, the vehicle size increases. This allows parking-space sensor 30 to constantly still be able to detect at least the upper part of a vehicle while it is being steered into the parking space.

It becomes clear that in this example, even though parking area 20 is occupied by many vehicles 50, 60 of different size and especially different vehicle height, optimal coverage of parking area 20 may be accomplished by a single parking-space sensor 30, and in contrast to the situation shown in FIG. 3, there is no need for a large number of parking-space sensors 30. Of course, the principle according to the present invention may also be applied to more complex parking areas such as parking garages having several levels, for instance. By assuming an average size distribution of vehicles 50, 60 which will use the valet parking system, and the known spatial and geometrical features of parking area 20 and of parking spaces 24, according to the present invention, the layout of the parking-space monitoring system may be optimized in terms of number and placement of parking-space sensors 30 needed.

The present invention in all its aspects helps to optimize both the safety as well as the investment costs of valet parking systems.

What is claimed is:

1. A valet parking system for automatically bringing a vehicle to an assigned parking space within a predefined parking area, comprising:
    a central control unit; and
    a parking-space monitoring system having at least one stationary parking-space sensor, the parking-space monitoring system being configured to at least one of:
    (i) detect a state of occupancy of parking spaces of the parking area and to transmit a current state of occupancy to the central control unit, and (ii) localize vehicles moving autonomously or waiting within the predefined parking area, and to transmit information about a present vehicle position to the central control unit, the central control unit being configured to assign a free parking space to a vehicle and to transmit information to the vehicle so that the vehicle is able to be brought autonomously along a trajectory to the assigned parking space;
    wherein the central control unit is configured to assign a free parking space to the vehicle as a function of geometrical dimensions of the vehicle, so as to maximize visibility of the parking spaces to the at least stationary sensor, the geometrical dimensions including a height of the vehicle, and
    wherein vehicles having a larger size are parked directly laterally of the parking-space sensor in closer parking spaces, or at a further field of view, in farther parking spaces, wherein parking spaces between the closer parking space and the farther parking spaces are assigned to vehicles by a heuristic process so that smaller vehicles are parked at a closer distance to the parking-space sensor, and vehicle of increasing sizes are parked at a farther distance from the parking-space sensor, so that the parking-space sensor is able to detect at least an upper part of a vehicle while it is being steered into the parking space.

2. The system as recited in claim 1, wherein a free parking space is assigned to the vehicle in such a way that obstruction of the field of view of the parking-space sensors of the parking-space monitoring system by the parked vehicle is minimized.

3. The system as recited in claim 1, wherein the at least one parking-space sensor includes a 2-D camera or 3-D camera.

4. The system as recited in claim 1, wherein the at least one parking-space sensor of the parking-space monitoring system is disposed in such a way that the field of view of the parking-space monitoring system covers at least one of: i) a maximum number of parking spaces, and ii) all access routes and maneuvering areas.

5. The system as recited in one of claim 1, wherein the system includes a device to determine the geometrical dimensions of the vehicle.

6. The system as recited in claim 5, wherein the devices includes at least one sensor.

7. A method for laying out a valet parking system, the valet parking system including a central control unit, and a parking-space monitoring system having at least one stationary parking-space sensor, the method comprising:
    performing, via the parking-space monitoring system, at least one of:
        detecting a state of occupancy of parking spaces of the parking area and to transmit a current state of occupancy to the central control unit; and
        localizing vehicles moving autonomously or waiting within the predefined parking area, and transmitting information about a present vehicle position to the central control unit;
    assigning, via the central control unit, a free parking space to a vehicle and transmitting information to the vehicle so that the vehicle is able to be brought autonomously along a trajectory to the assigned parking space, wherein the central control unit is configured to assign a free parking space to the vehicle as a function of geometrical dimensions of the vehicle, so as to maximize visibility of the parking spaces to the at least stationary sensor, the geometrical dimensions including a height of the vehicle; and
    selecting a number and placement of the parking-space sensors of the parking-space monitoring system so that at least one of the following is satisfied: (i) providing sufficient detection of the state of occupancy of all parking spaces of the predefined parking area, and (ii) providing all positions of the autonomously moving or waiting vehicles at all times, and
    wherein vehicles having a larger size are parked directly laterally of the parking-space sensor in closer parking spaces, or at a further field of view, in farther parking spaces, wherein parking spaces between the closer parking space and the farther parking spaces are assigned to vehicles by a heuristic process so that smaller vehicles are parked at a closer distance to the parking-space sensor, and vehicle of increasing sizes are parked at a farther distance from the parking-space sensor, so that the parking-space sensor is able to detect at least an upper part of a vehicle while it is being steered into the parking space.

8. The method as recited in claim 7, wherein the parking-space sensors are placed by assuming an occupancy of the predefined parking area with vehicles of an average size distribution.

9. The method as recited in claim 7, wherein geometrical features of the predefined parking area and possible sight obstructions are taken into account when determining the number and placement of the parking-space sensors.

10. A valet parking method for automatically bringing a vehicle to an assigned parking space within a predefined parking area, the method comprising:
    detecting continuously, using a parking-space monitoring system having at least one parking-space sensor, at least one of: (i) a current state of occupancy of the parking spaces of the parking area, and (ii) a present position of autonomously moving or waiting vehicles within the parking area;

transmitting, to a central control unit, the at least one of the current state of occupancy and the present position of the vehicles moving autonomously or waiting within the predefined parking area;

assigning, by the central control unit, a free parking space to a vehicle; and transmitting information to the vehicle, so that the vehicle is able to be brought autonomously along a trajectory to the assigned parking space;

wherein the central control unit is configured to assign at least one of the free parking space and a trajectory to the vehicle as a function of geometrical dimensions of the vehicle, the geometrical dimensions including a size of the vehicle, including a height of the vehicle, so that obstruction of the field of view of the at least one parking-space sensor by the vehicle at least one of during and after the parking maneuver is minimized, so as to maximize visibility of the parking spaces to the at least stationary sensor, and wherein vehicles having a larger size are parked directly laterally of the parking-space sensor in closer parking spaces, or at a further field of view, in farther parking spaces, wherein parking spaces between the closer parking space and the farther parking spaces are assigned to vehicles by a heuristic process so that smaller vehicles are parked at a closer distance to the parking-space sensor, and vehicle of increasing sizes are parked at a farther distance from the parking-space sensor, so that the parking-space sensor is able to detect at least an upper part of a vehicle while it is being steered into the parking space.

11. The method as recited in claim 10, wherein the geometrical dimensions including the height, of the vehicle are measured prior to assigning a parking space.

12. The method as recited in claim 10, wherein the geometrical dimensions including the height, of the vehicle are determined prior to assigning a parking space, by detecting a type of vehicle and taking the geometrical dimensions from a table stored in the central control unit.

* * * * *